T. W. LANE.
Vehicle-Spring.
No. 218,034. Patented July 29, 1879.
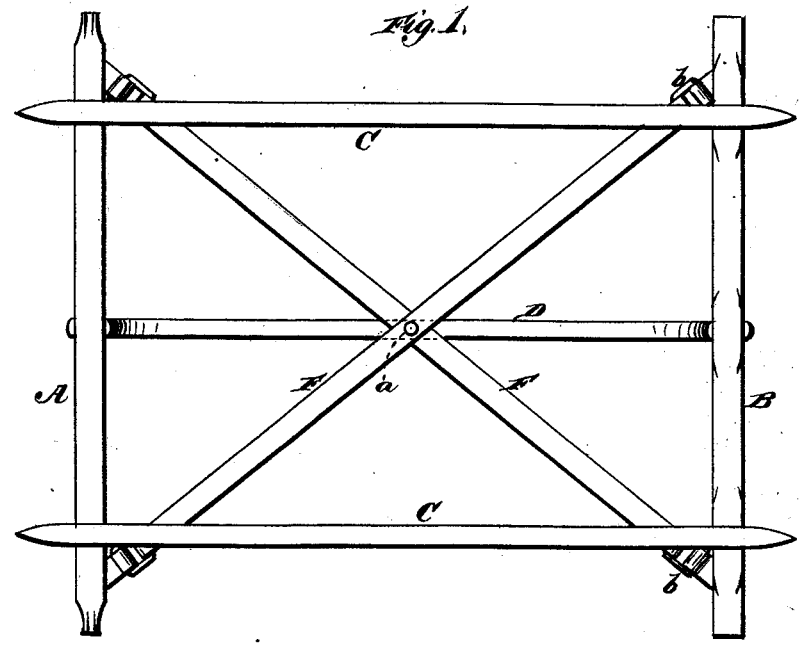
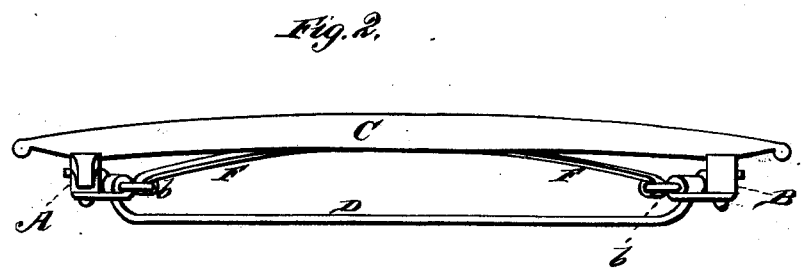
WITNESSES
INVENTOR

UNITED STATES PATENT OFFICE.

THOMAS W. LANE, OF AMESBURY, MASSACHUSETTS.

IMPROVEMENT IN VEHICLE-SPRINGS.

Specification forming part of Letters Patent No. 218,034, dated July 29, 1879; application filed June 14, 1879.

*To all whom it may concern:*

Be it known that I, THOMAS W. LANE, of Amesbury, in the county of Essex and State of Massachusetts, have invented certain new and useful Improvements in Vehicle-Springs; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan of my vehicle-spring, and Fig. 2 is a side elevation view of the same.

My invention relates to springs for vehicles; and it consists in two springs, of one or more leaves each, crossing each other in the center, and connected by shackles or otherwise at their ends, with the front head-block and rear axle, and a depressed central perch, as will be hereinafter more fully set forth.

The annexed drawings, to which reference is made, fully illustrate my invention.

A represents the front head-block, and B the rear axle, of a vehicle, which are shown as connected by means of the side bars, C C; but my invention is equally applicable to vehicles having no side bars. D represents the perch connecting the head-block A and axle B in the center. This perch is depressed, as shown, or, in other words, its ends are curved upward, and then turned outward and fastened to the head-block and axle, whereby the main portion of the perch will lie in a plane below that of the head-block and axle, giving ample room for the sagging of the springs.

F F represent the springs, which may be made of one or more leaves, as desired, and cross each other in the center, where they are fastened together by a bolt or rivet, $a$, or otherwise, the springs being in the form of a letter X. The ends of the springs F F are connected to the head-block A and axle B by shackles $b\ b$.

By this construction the springs are considerably longer than usual, which makes them ride easier, and the body of the vehicle is to be attached to cross-bars fastened on the springs, whereby the body will be directly over the center of the springs, where they are crossed and fastened together.

I claim—

In a vehicle, the springs F F, crossing each other at or near their centers, and having their ends connected by shackles to the front head-block and rear axle, in combination with said front head-block and rear axle, and the depressed perch connecting the same, as and for the purposes set forth.

In testimony that I claim the above I have hereunto subscribed my name in the presence of two witnesses.

THOMAS W. LANE.

Witnesses:
J. T. CLARKSON,
W. T. CLARKSON.